United States Patent
Tsai et al.

(10) Patent No.: US 7,697,533 B2
(45) Date of Patent: Apr. 13, 2010

(54) COMMUNICATION DEVICE AND METHOD

(75) Inventors: Shang-Ho Tsai, Kaohsiung (TW);
Shih-Chung Yin, Hsinchu (TW);
Po-Yuen Cheng, San Jose, CA (US);
Chung-Yen Huang, Miao-Li Hsien (TW)

(73) Assignee: Mediatek Inc., Hsin-Chu (TW)

( * ) Notice: Subject to any disclaimer, the term of this patent is extended or adjusted under 35 U.S.C. 154(b) by 401 days.

(21) Appl. No.: 11/751,076

(22) Filed: May 21, 2007

(65) Prior Publication Data
US 2008/0144628 A1 Jun. 19, 2008

Related U.S. Application Data

(60) Provisional application No. 60/870,141, filed on Dec. 15, 2006.

(51) Int. Cl.
*H04L 12/56* (2006.01)
(52) U.S. Cl. ........................ 370/392; 375/316
(58) Field of Classification Search ................ 375/316, 375/289; 370/392, 395.52; 455/67.11
See application file for complete search history.

(56) References Cited

U.S. PATENT DOCUMENTS

| | | | |
|---|---|---|---|
| 2004/0161052 A1* | 8/2004 | Santhoff et al. | 375/289 |
| 2005/0003766 A1* | 1/2005 | Chen | 455/67.11 |
| 2005/0195930 A1* | 9/2005 | Spital et al. | 375/368 |
| 2007/0071009 A1* | 3/2007 | Nagaraj et al. | 370/395.52 |
| 2009/0028271 A1* | 1/2009 | Aoki et al. | 375/316 |
| 2009/0141723 A1* | 6/2009 | Giesberts et al. | 370/392 |

* cited by examiner

*Primary Examiner*—Chi H Pham
*Assistant Examiner*—Albert T Chou
(74) *Attorney, Agent, or Firm*—Thomas, Kayden, Horstemeyer & Risley

(57) ABSTRACT

A communication device and a method of processing input data. The communication device, processing input data constituting at least one of data packet comprises a detection unit, an Automatic Gain Controller (AGC), a signal processor, a demodulator, a pre-detection module, and a Baseband module. The detection unit receives the input data to perform the packet detection. The Automatic Gain Controller, coupled to the detection unit, generates an adjusted data and a gain control parameter once packet is detected. The signal processor, coupled to the AGC, performs the data signal processing includes at least one of analog to digital transformation processing, radio frequency processing and baseband processing, and detects at least one of the desired signal, noise and interference. The demodulator, coupled to the signal processor, demodulates the processed data into a processed data according to at least one processing function of noise reduction, interference reduction, and signal compensation. The pre-detection module, coupled to the demodulator, determines whether a potential error has occurred in the demodulated input data by a pre-detection method prior completing retrieval of the data packet for performing a packet-based error check sequence, and performs a selection to decide whether the components need to be terminated and which of the components need to be terminated if there is a potential error occurred on the demodulated input data. The Baseband module, coupled to the demodulator, performs a packet-based error check on the data packet upon completing retrieval of the data packet if there is no potential error occurred on the demodulated input data.

23 Claims, 9 Drawing Sheets

COMMUNICATION DEVICE AND METHOD

CROSS REFERENCE

This application claims the benefit of U.S. provisional application Ser. No. 60/870,141 filed Dec. 15, 2006, the subject matter of which is incorporated herein by reference.

BACKGROUND OF THE INVENTION

1. Field of the Invention

The invention relates in general to wireless communication, and in particular, to a method and communication device in a packet-based communication system.

2. Description of the Related Art

Upon receipt of a data packet at a wireless receiving station, the receiving station may detect packet error through Frame Check Sequence (FCS) check, such as parity check coding or signaling check code, after the data packet has been received. If the computed FCS matches the FCS transmitted with the packet, a receiving station may accept the packet, otherwise, the receiving station may discard the packet. In this manner, the receiving station can determine validity of the receipt data.

Due to a variety of factors, such as interference or burst noise, data packets are sometimes corrupted prior of FCS check although the convolutional code has been provided to correct the errors. In general, FCS check is started until the whole packet is fully received and is started after signal processing demodulation has been applied to the received packet. However, such communication flow system would waste tremendous power and have the potential risk to loss the packet.

In the case of hidden node situation, packet loss might occur. For example, station STA A can receive signals from station STA B and access point (AP) while the AP can only receive signal from station STA A (hidden node issues). If STA B sends STA A data packets, STA A may continue receiving the packets from STA B and ignore the signal from AP, resulting in losing data packets from the AP and corrupted data packets from station STA B.

In the case of the packet length information of a data packet is decoded incorrectly, the packet might loss as well. Take a WLAN system for instance, the packet length information in the SIGNAL Field may be decoded incorrectly. This could happen because there is only one parity check bit in the SIGNAL Field. Packet loss may occur if the wrongly decoded packet length is greater than the correct packet length. For instance, if the correct packet length is 1024 bytes and the wrongly decoded packet length is 65535 bytes, the receiver will not stop receiving packet until the packet length reaches 65535 bytes. However, since the correct packet is only 1024 bytes, other stations or access points may transmit packets after they receive 1024 bytes. In this case, data packets are lost due to the wrongly decoded packet length.

Another issue is power consumption; for instance, wireless devices employing portable power storage cells such as batteries, with inherently limited storage capacity, normally would require effective power management solution. FIGS. 1a, b, and c are packet formats compliant with IEEE 802.11n standard, representing non-HT (high throughput), HT mixed mode, and HT Greenfield mode respectively. Non-HT mode is a low throughput data format. HT Greenfield and HT mixed modes are high throughput data formats applicable to MIMO-OFDM (Multiple Input, Multiple Output Orthogonal Frequency Division Multiplexing). To guarantee that high throughput (HT) devices, IEEE 802.11n standard has interoperability with legacy devices including IEEE 802.11a/g devices, referred to as Mixed Mode. The SIGNAL FIELD of HT-device in this mode uses a means known as "Spoofing" to reserve the maximum packet length so that the Legacy devices will follow to reserve the maximum packet length for HT-devices. Without termination mechanism, Legacy device will perform signal processing and modulation until the reserve time is reached. However, since this packet is for HT-devices, there is no way that the Legacy devices can decode the packet correctly. In this case, great power consumption is wasted for packets that are expected to be wrong.

Thus a need exists for a communication device and a method to process data packet to reduce power consumption and packet loss.

BRIEF SUMMARY OF THE INVENTION

A detailed description is given in the following embodiments with reference to the accompanying drawings.

According to the invention, a method of processing input data constituting at least one of data packet in a receiver is disclosed, comprising receiving the input data to perform the packet detection process, generating an adjusted data and an gain control parameter once packet is detected, performing signal processing and demodulation to transform the adjusted data into a demodulated data according to at least one processing function of bit rate reduction, noise reduction, interference reduction, and signal compensation, wherein said signal processing and demodulation perform the data signal processing includes at least one of analog to digital transformation processing, radio frequency processing and base-band processing, wherein the signal processing and demodulation further include detecting at least one of the desired signal, noise and interference, determining whether an potential error has occurred in the demodulated input data by a pre-detection method prior of completing retrieval of the data packet for performing a packet-based error check sequence, performing a selection to decide whether the components need to be terminated and which of the components need to be terminated if there is the potential error occurred on the demodulated input data, and performing a packet-based error check on the data packet upon completing retrieval of the data packet if there is no potential error occurred on the demodulated input data.

According to another embodiment of the invention, a communication device, processing input data constituting at least one of data packet comprises a detection unit, an Automatic Gain Controller (AGC), a signal processor, a demodulator, a pre-detection module, and a baseband module. The detection unit receives the input data to perform the packet detection. The Automatic Gain Controller, coupled to the detection unit, generates an adjusted data and a gain control parameter once packet is detected. The signal processor, coupled to the AGC, performs the data signal processing includes at least one of analog to digital transformation processing, radio frequency processing and base-band processing, and detects at least one of the desired signal, noise and interference. The demodulator, coupled to the signal processor, demodulates the processed data into a processed data according to at least one processing function of noise reduction, interference reduction, and signal compensation. The pre-detection module, coupled to the demodulator, determines whether an potential error has occurred in the demodulated input data by a pre-detection method prior of completing retrieval of the data packet for performing a packet-based error check sequence, and performs a selection to decide whether the components need to be terminated and which of the components need to be terminated if there is an potential error occurred on the demodulated input data. The baseband module, coupled to the demodulator, performs a packet-based error check on the data packet upon completing retrieval of the data packet if there is no potential error occurred on the demodulated input data.

BRIEF EQUALIZED DATA DESCRIPTION OF THE DRAWINGS

The invention can be more fully understood by reading the subsequent detailed description and examples with references made to the accompanying drawings, wherein:

FIGS. 1a, b, and c are packet formats compliant with IEEE 802.11n standard.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention is described herein in the context of processing a packet. It will be understood that the term "packet" means a unit of information that may be transmitted electronically as a whole from one device to another. Accordingly, as used herein, the term "packet" may encompass such terms of art as "frame" or "message," which may also be used to refer to a unit of transmission.

Figure 1A:
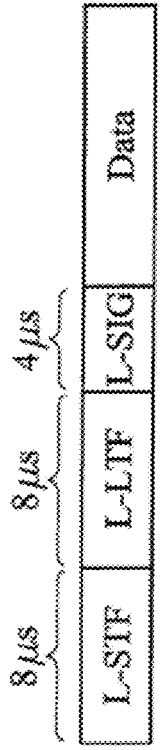
Figure 1B:
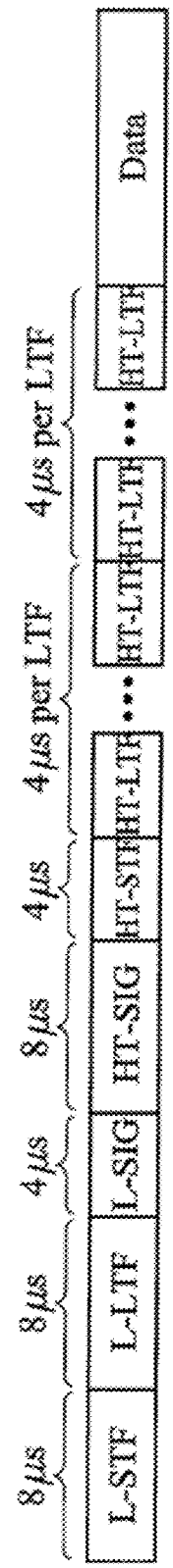
Figure 1C:
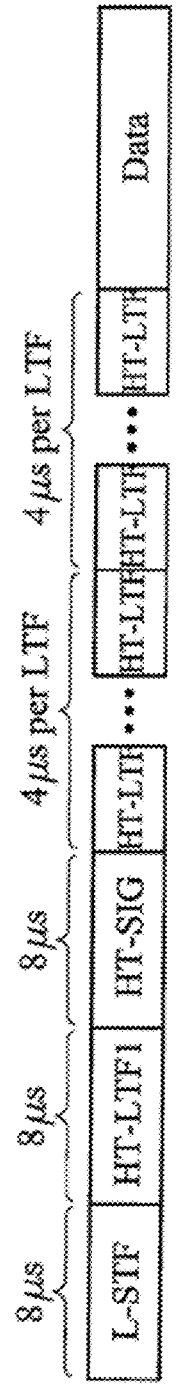
Figure 2:
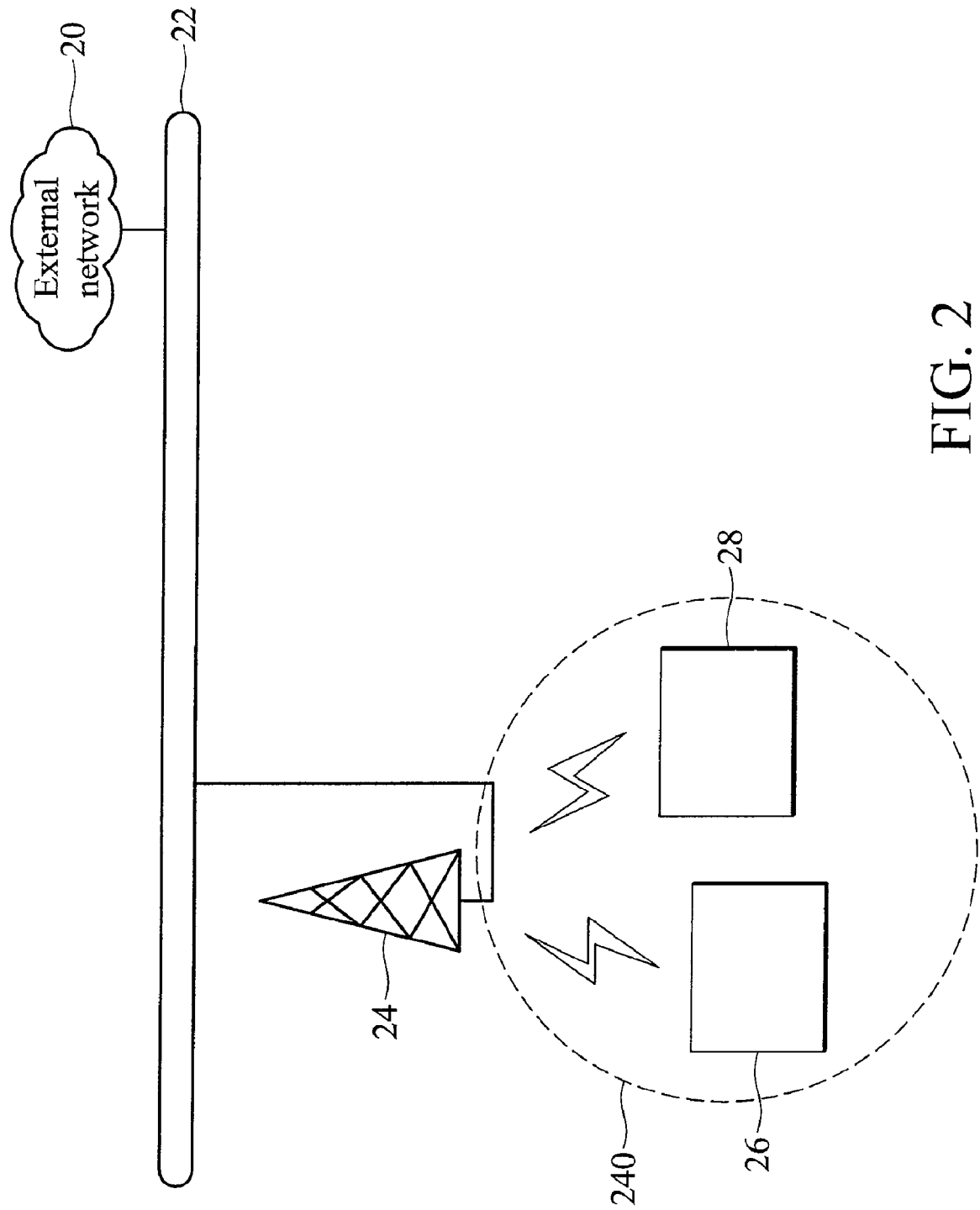
FIG. 2 is a block diagram of an exemplary packet-based communication system according to the invention.

FIG. 2 is a block diagram of an exemplary packet-based communication system according to the invention, comprising external network 20, WLAN distribution system 22, access point 24, mobile stations 26 and 28.

Access point 24 provides basic service set 240 covering mobile stations 26 and 28 for wireless communication, and accesses internal or external network via WLAN distribution system 22 and external network 20.

Figure 3:
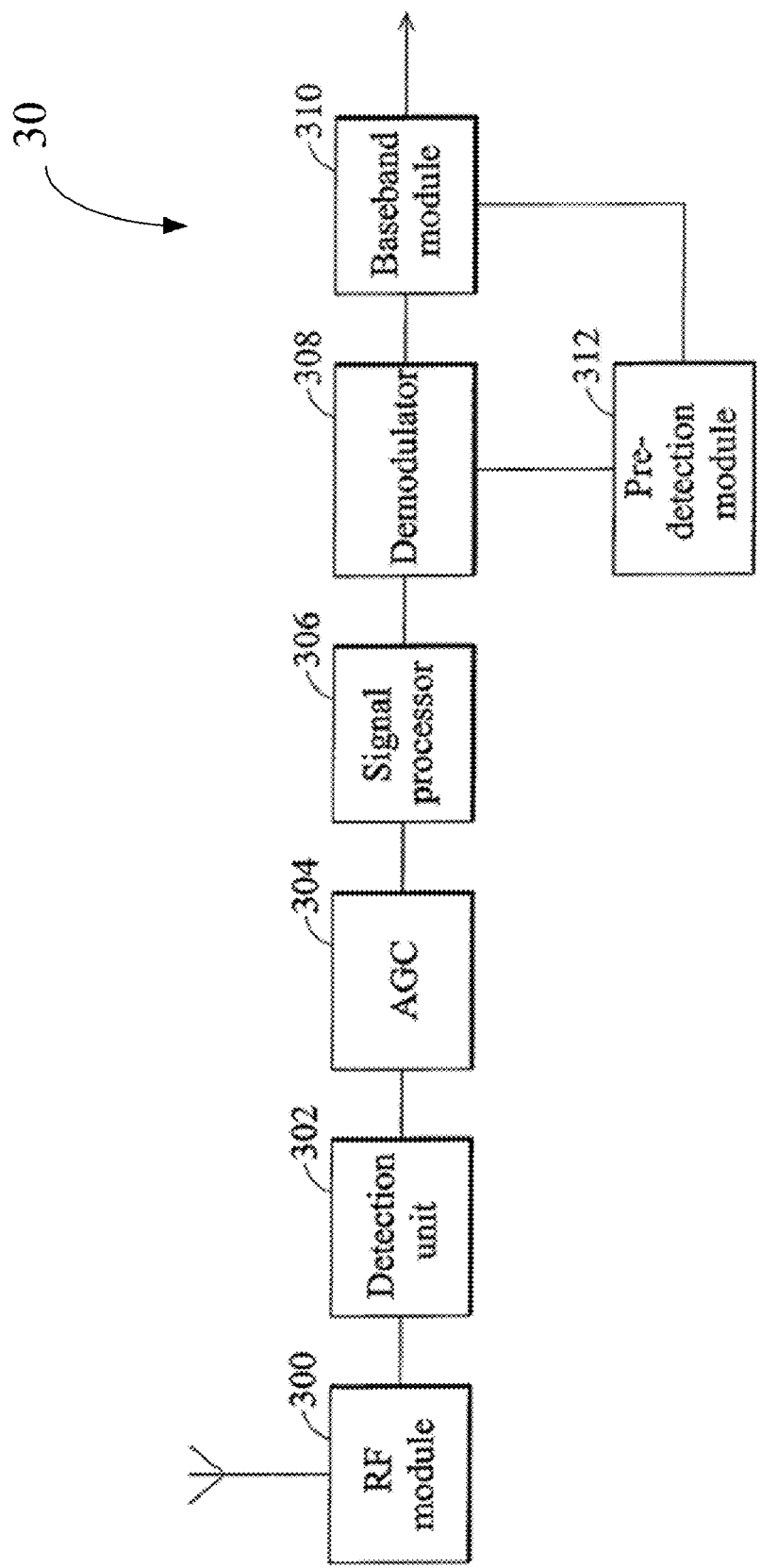
FIG. 3 is a block diagram of an exemplary communication device capable of saving power in FIG. 2.

FIG. 3 is a block diagram of an exemplary communication device capable of saving power in FIG. 2, comprising RF module 300, detection unit 302, AGC 304, signal processor 306, demodulator 308, baseband module 310, and pre-detection module 312. RF module 300 is coupled to detection unit 302, AGC 304, signal processor 306, demodulator 308, and subsequently coupled to baseband module 310 and pre-detection module 312, both coupled to one another.

During a receiving mode, RF module 300 utilizes an antenna to receive RF input signal via an air protocol such as AMPS, CDMA, GSM, TDMA, or equivalent radio frequency or satellite communication protocols. Detection unit 302 in turn receives the RF input data to perform packet detection thereon, by means of detecting energy increase or correlating preambles. Automatic Gain Controller (AGC) 304 generates an adjusted data and a gain control parameter once the packet is detected. Signal processor 306 obtains the adjusted data to perform the data signal processing includes at least one of analog to digital conversion (ADC) processing, radio frequency processing and filtering, and detects at least one of the desired signal, noise and interference. Demodulator 308 demodulates the processed data into a processed data according to at least one processing function of noise reduction, interference reduction, and signal compensation. Pre-detection module 312 determines whether an potential error has occurred in the demodulated input data by a pre-detection method prior completing retrieval of the data packet for performing a packet-based error check sequence, and performs a selection to decide whether the components need to be terminated and which of the components need to be terminated if there is an potential error occurred on the demodulated input data. Baseband module 310 performs a packet-based error check on the data packet upon completing retrieval of the data packet if there is no potential error occurred on the demodulated input data.

When the potential error occurs, pre-detection module 312 controls baseband module to generate an error indication signal.

Figure 4:
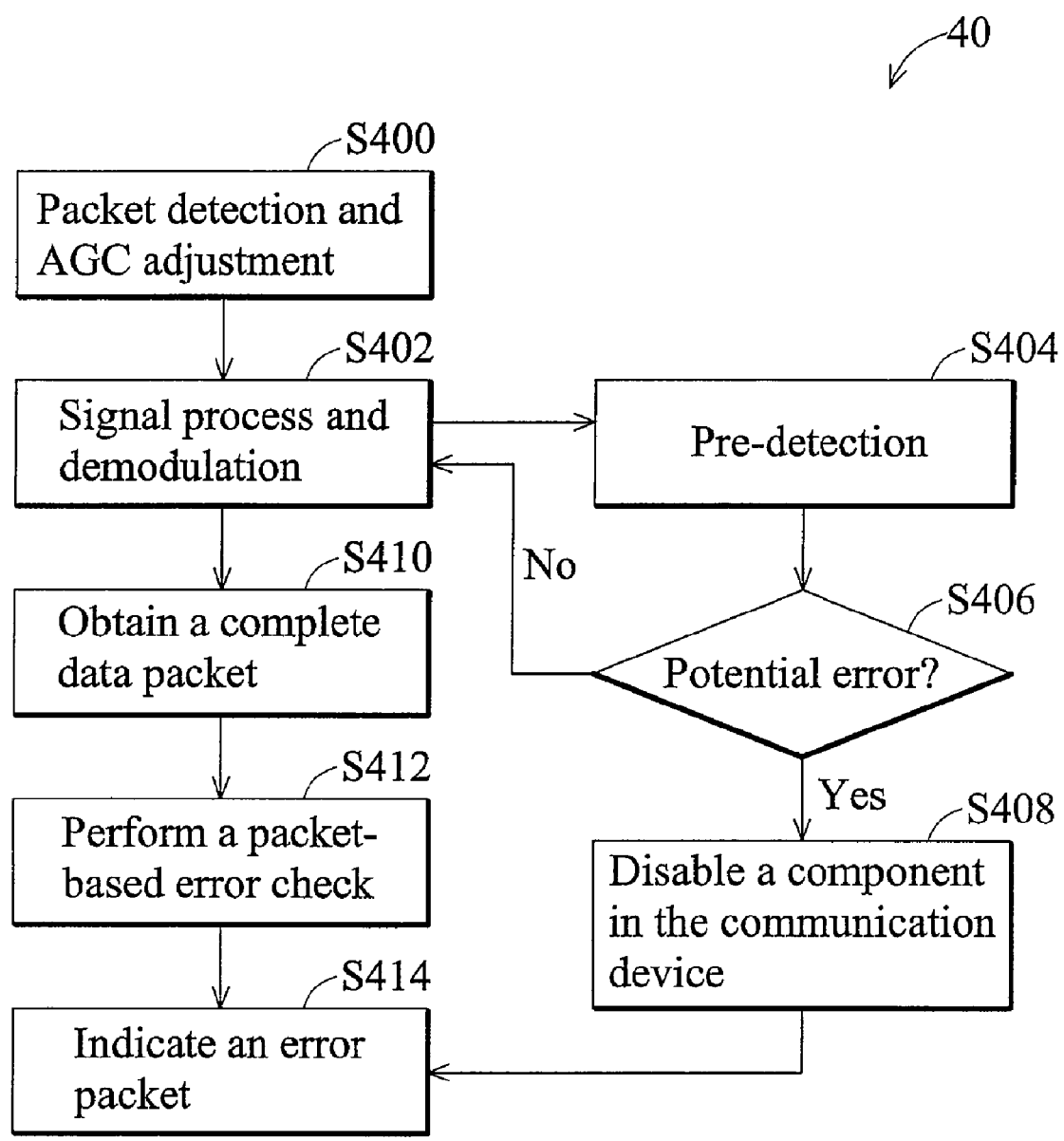
FIG. 4 is a flowchart of an exemplary data processing method according to the invention, incorporating the communication device in FIG. 3.

FIG. 4 is a flowchart of an exemplary data processing method according to the invention, incorporating the communication device in FIG. 3.

In step S400, detection unit 302 performs packet detection on the received RF signal, and AGC 304 adjusts gain of RF module 300 so that the adjusted data remains substantially constant irrespective of the signal strength of the input data.

Next in step S402, signal processor 306 and demodulator 308 perform signal processing and demodulation to transform the adjusted data into a demodulated data according to processing function of noise reduction, interference reduction, or signal compensation. The signal processing and demodulation are performed to reconstruct the transmitted bit stream from the transmission end, including receive filtering, time and frequency estimation and compensation, FFT, frequency domain equalization, tracking mechanism, analog to digital conversion, convolutional (Viterbi) decoding, interleaving and scrambling. The signal processing and demodulation also includes detecting at least one of the desired signal, noise and interference.

In Step S404, pre-detection module 312 performs a pre-detection method prior completing retrieval of the data packet to determine whether a potential error has occurred in the demodulated input data. When the potential error occurs, pre-detection module 312 controls baseband module to generate an error indication signal. The pre-detection method may be determined by energy level of the RF input signal, preamble data in the demodulated data, noise and interference of the demodulated data, or path metrics characteristics of Viterbi decoding.

Then in step S406, pre-detection module 312 performs a selection to decide whether the components need to be terminated and which of the components need to be terminated if there is a potential error occurred on the demodulated input data. Data processing method goes to step S408 if the potential error is occurred, and continues step S402 if otherwise.

Pre-detection module 312 then disables an appropriate component in communication device 30 for a predetermined duration (S408) and generates an error indication signal (S414). Pre-detection module 312 may disable RF module 300, signal processor 306, and baseband module 310 until the end of the present data packet to decrease power consumption. Pre-detection module 312 may also reinitialize another packet detection in detection unit 302, and disable baseband module 310 until the other data packet is detected, so that packet loss of the input data is reduced.

In step S410, communication device 30 obtains a complete data packet in the RF input signal to generate demodulated input data, so that baseband module 310 can perform a packet-based error check on the demodulated input data to determine validity (step S412). The packet-based error check may be Frame Check Sequence (FCS) error check. If the demodulated input data is invalid, baseband module 310 generates an error indication signal in step S414.

In the conventional data processing method, the communication device cannot determine the validity of the input data until full data packet is retrieved, RF processing, signal processing, demodulation, and baseband processing continues to run throughout the data packet, thus power consumption remains high in comparison to the method disclosed in FIG. 4. Method 40 makes a decision to continue or stop one or more components in communication device 30 prior to fully reception of a data packet, reducing power consumption yet decreasing packet loss concurrently.

The pre-detection method can be selected one from a various of detection methods, such as energy detection, preamble detection, pilot tones detection, data tones detection and path metrics detection. Methods 50 through 80 as illustrated in FIG. 5-8 show exemplary pre-detection methods using IEEE 802.11a/b/g/n standards.

Figure 5:
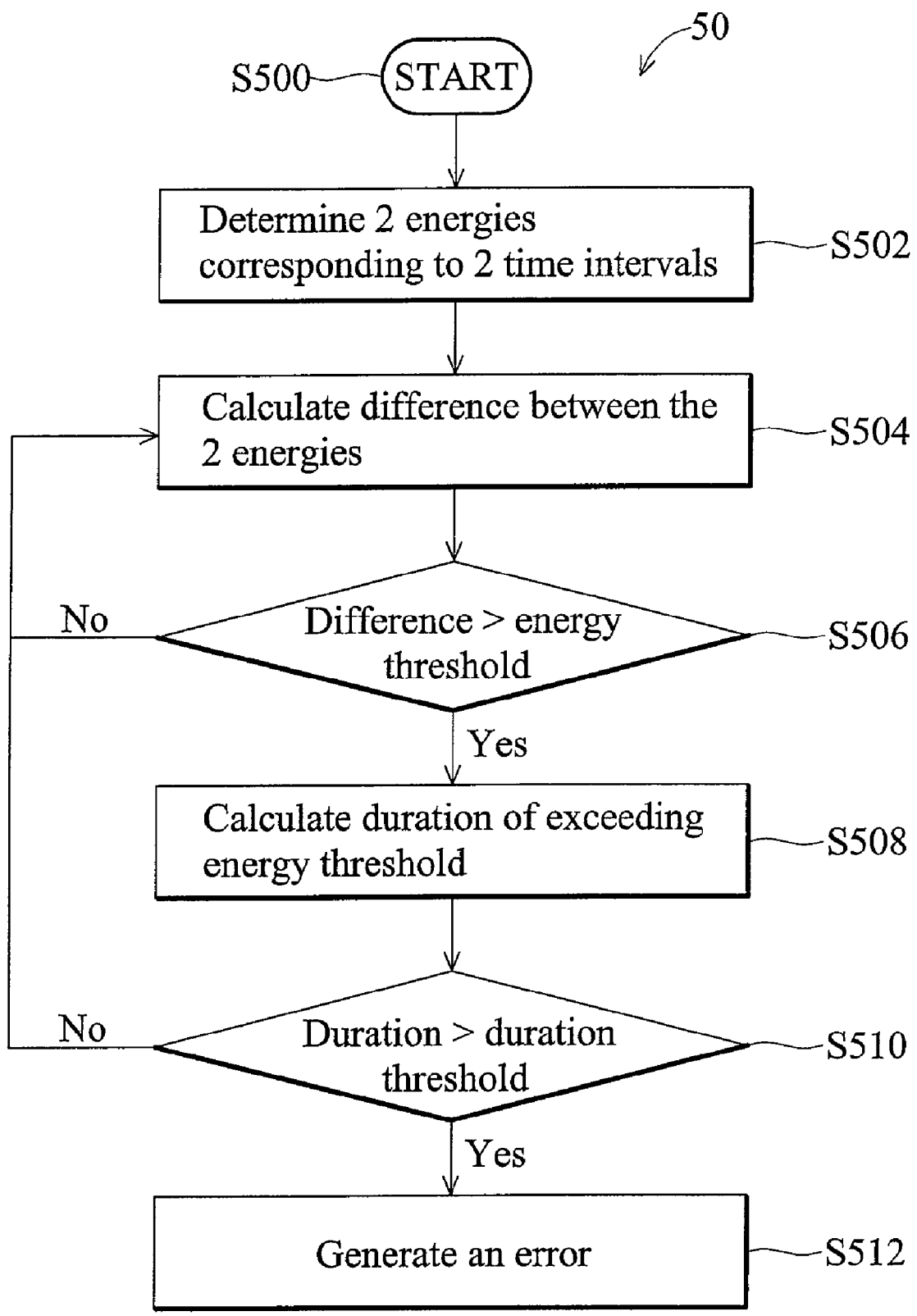
FIG. 5 is a flowchart of an exemplary pre-detection method incorporated in FIG. 4, incorporating the communication device in FIG. 3.

FIG. 5 is a flowchart of an exemplary pre-detection method incorporated in FIG. 4, incorporating the communication device in FIG. 3. Method 50 employs energy level or magnitude of the RF input signal to perform pre-determination for a potential error generation, thereby reducing power consumption or packet loss of communication device 30. If the measured energy level or magnitude suddenly drops or raises to an unreasonable level for a predetermined period, the data packet can no longer be decoded correctly and hence an potential error is generated. Method 50 is performed in time domain.

In Step S500, the pre-detection method starts, difference and duration counters are reset to zero, then detection unit 302 determines 2 energy levels corresponding to 2 time intervals in the RF input signal (S502).

Next pre-detection module 312 receives the 2 energy levels to calculate a difference therebetween (S504), and compares the difference to a predetermined energy threshold in a register (S506), continues step S508 if the difference exceeds the energy threshold, and loops back to step S504 otherwise.

In step S508, pre-detection module 312 calculates duration of exceeding energy threshold. If the difference of energy levels exceeds the energy threshold persistently, the duration counter is increased accordingly.

Then pre-detection module 312 determines whether the duration counted by the duration counter exceeds a predetermined duration threshold in step S510. If so, method 50 goes to step S512, and if not, continues step S504. The predetermined duration threshold may be hold in another register.

In Step S512, pre-detection module 312 generates a potential error, since the energy level of the RF input signal has been experienced a level change exceeding the energy threshold over the time interval of the duration threshold. A noise or interference may be present in the data packet to cause the continuous level change, therefore a potential error flag is signified to disable one or more component in communication device 30 for reducing power consumption and packet loss.

Figure 6:
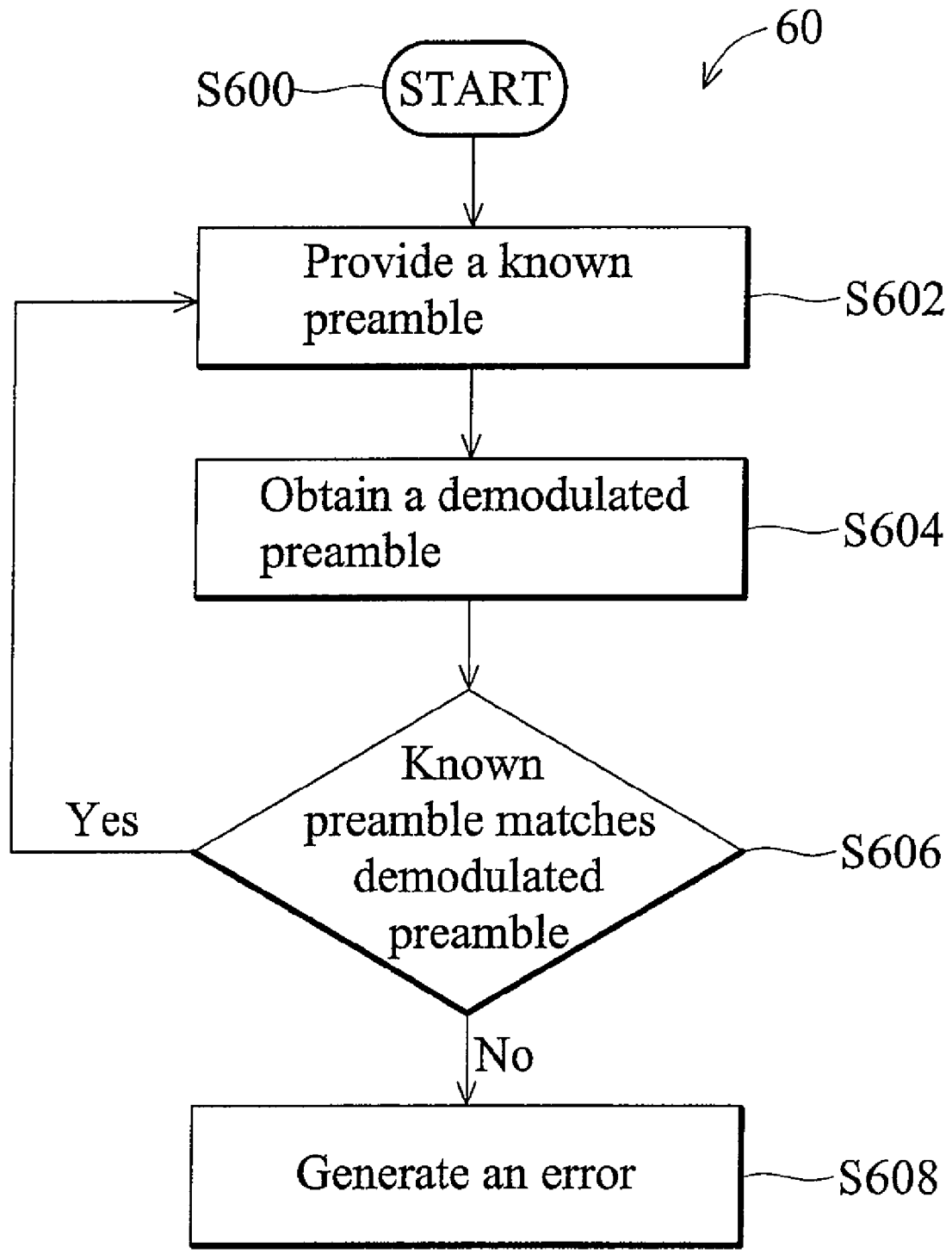
FIG. 6 is a flowchart of another exemplary pre-detection method incorporated in FIG. 4, incorporating the communication device in FIG. 3.

FIG. 6 is a flowchart of another exemplary pre-detection method incorporated in FIG. 4, incorporating the communication device in FIG. 3. Method 60 utilizes preambles of the demodulated data to perform pre-determination for a potential error generation. In packet-based communication systems, a training sequence, referred to as "preamble", is attached to the start of a data packet. The preamble is used to perform packet detection, AGC adjustment, time and frequency estimation and channel estimation. Since the preamble is known to the receiver of communication device 30, it can be used to determine the link quality and generate a potential error for a data packet.

In Step S600, the pre-detection method starts, then pre-detection module 312 is provided with a known preamble (S602) and obtains a demodulated preamble in the demodulated data (S604).

Pre-detection module 312 then compares the known preamble to the demodulated preamble in step S606, generates an error indication signal for the data packet if the demodulated preamble does not match the known preamble (S608), and continues for the next comparison if the demodulated preamble and the known preamble are identical.

Figure 7:
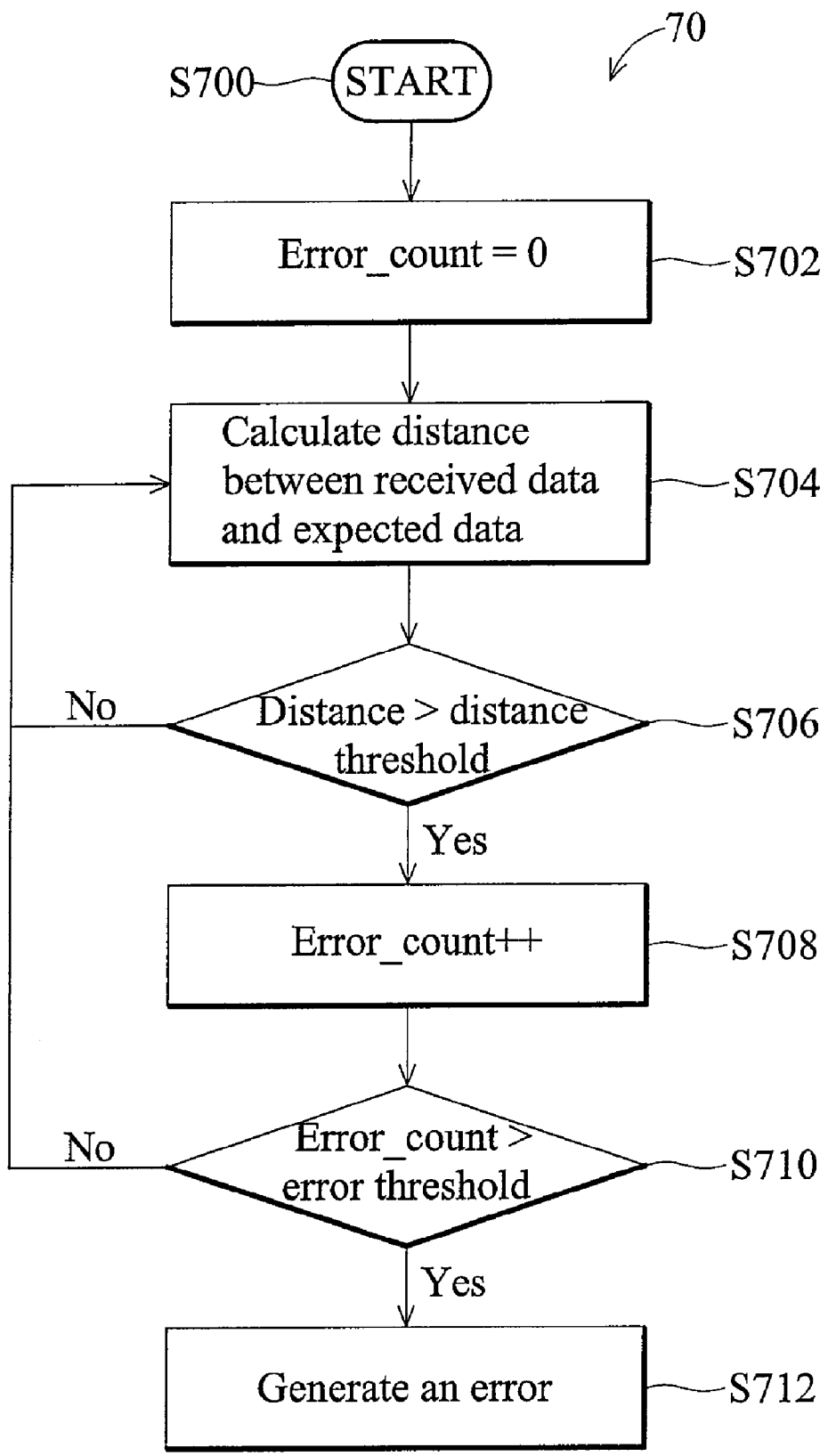
FIG. 7 is a flowchart of still another exemplary pre-detection method incorporated in FIG. 4, incorporating the communication device in FIG. 3.

FIG. 7 is a flowchart of still another exemplary pre-detection method incorporated in FIG. 4, incorporating the communication device in FIG. 3. Method 70 utilizes the demodulated data to perform predetermination for a potential error generation. The link quality of the transmission and the validity of a data packet can be determined from the constellation representations. More specifically, this can be determined from pilot tones or data tones after Viterbi decoding.

In Step S700, the pre-detection method starts, pre-detection module 312 obtains received constellation data and expected constellation data, then error counter error_count is reset to zero in step S702, and pre-detection module 312 calculate distance between the received constellation data and expected constellation data in step S704. The received constellation data may be a pilot tone or a data tone after Viterbi decoding. The expected constellation data may be a known pilot symbol or known data symbol accordingly. For example, an absolute distance $d_i=|\hat{p}_i-p_i|$ may be calculated for pilot tone $\hat{p}_i$ and known pilot symbol $p_i$, representing an error therebetween.

In step S706, pre-detection module 312 determines whether distance di exceeds a distance threshold in a register. If so pre-detection module 312 then continues step S708, and if not goes back to step S704 to calculate the next error distance.

In step S708, error counter error_count is increased since error distance di exceeds the distance threshold, it is likely the received constellation data is corrupted due to noise or interference in transmission.

Pre-detection module 312 next checks if error counter error_count exceeds an error threshold, generates an error indication signal in S712 if so, and returns to step S704 for more error distance calculation otherwise. The error threshold is stored in a register.

Both distance threshold and error threshold may be set by control register during initialization.

Figure 8:
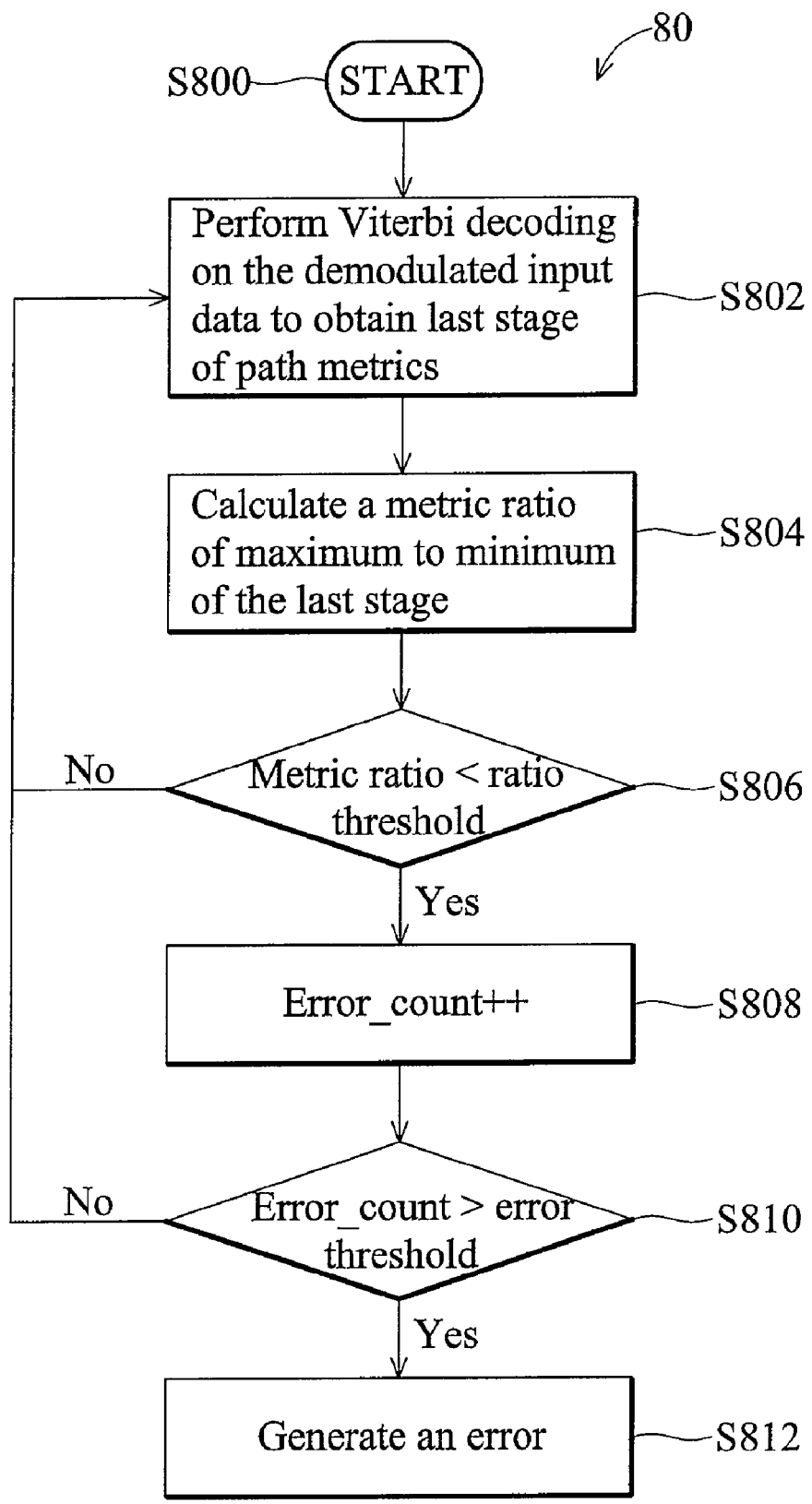
FIG. 8 is a flowchart of yet another exemplary pre-detection method incorporated in FIG. 4, incorporating the communication device in FIG. 3.

FIG. 8 is a flowchart of yet another exemplary pre-detection method incorporated in FIG. 4, incorporating the communication device in FIG. 3. Method 80 utilizes path metric of Viterbi decoding to perform predetermination for a potential error generation. When Viterbi algorithm is used to decode the received signal, a path metrics is used to determine the link quality. More specifically, the last stage of the path metrics is used. In the embodiment, the minimum path metrics produces optimal path metrics of the data packet. In general, when the link condition is good, the metrics at the last stage in individual states should have little difference. For instance, in the final stages of 4-state Viterbi decoding, one has the final path metrics {15, 165, 185, 300}, and the other has {100, 125, 115, 93}. The former case has better link quality because the corresponding most-likely (metrics=15) and most-unlikely (metrics=300) differs more than that in the second case.

In Step S800, the pre-detection method starts, then baseband module 310 performs Viterbi decoding on the demodulated input data to obtain the last stage of path metrics in step S802.

Figure 9:
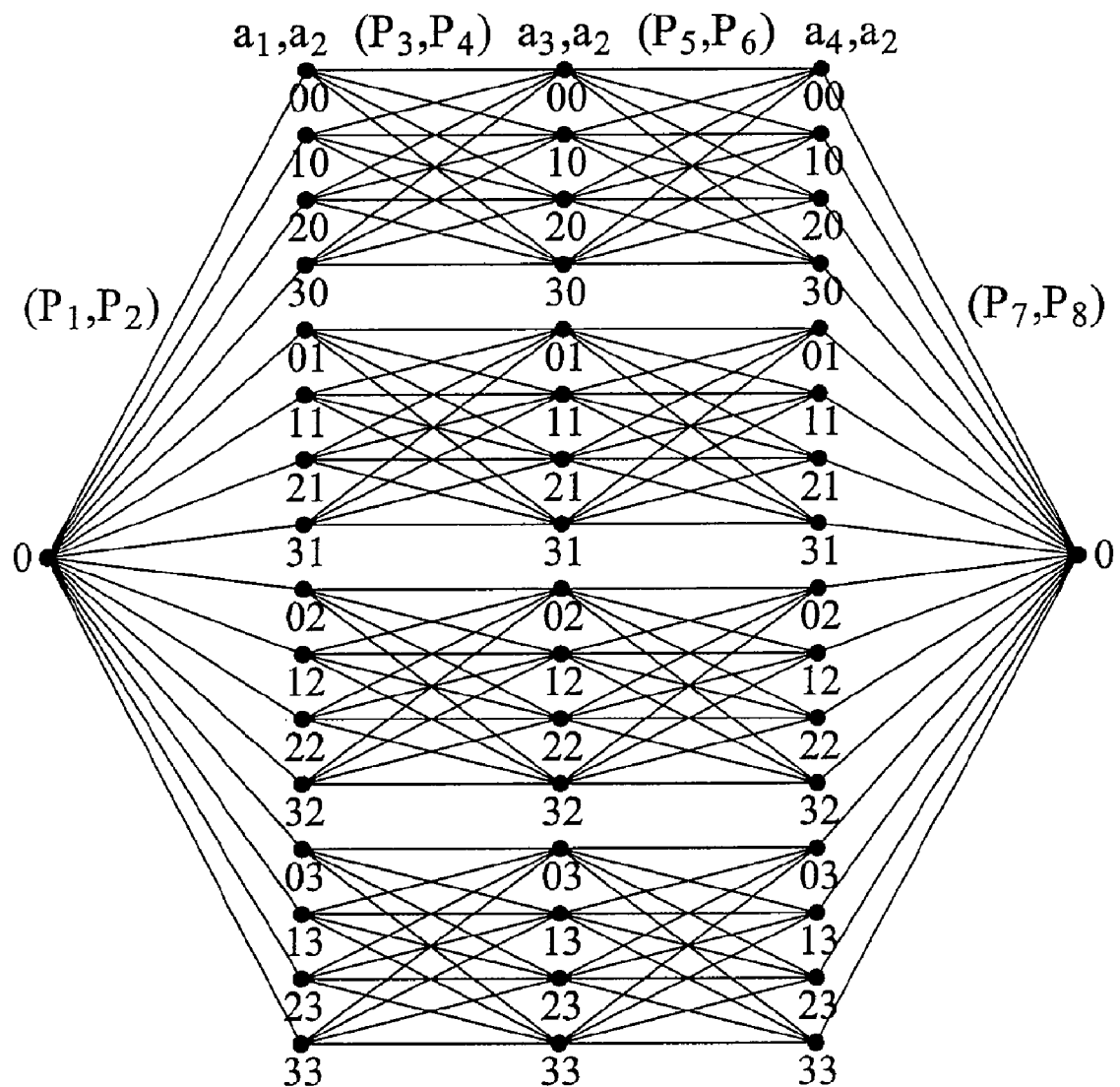
FIG. 9 is a 16-state radix-4 trellis diagram illustrating Viterbi decoding process

Next, pre-detection module 312 calculates a metric ratio of maximum to minimum of the last stage of the path metrics (S804), and compares the metric ratio with a predetermined ratio threshold in a register, continues step S808 if the metric ratio is less than the ratio threshold, and returns to step S802 to perform another round of Viterbi decoding otherwise. FIG. 9 is a 16-state radix-4 trellis diagram illustrating Viterbi decoding process, depicting the possible states of the encoded data over a sequence of times. At each data time, data may be in one of states 00 through 33. Viterbi decoding process calculates likelihood of the input data at each state to generate path metrics, indicated by dot 00 through 33 on FIG. 9. The path metric represents the likelihood of each candidate state for each possible previous state. If the maximum and minimum likelihood in the path metric are close, the link quality is low and the decoded data may contain errors, thus a potential error is generated. The modulation schemes may be Barker code, DBPSK, DQPSK and CCK. The metric ratio may be calculated as:

$$\text{Metric ratio} = \max(\text{Metric}[i])/\min(\text{Metric}[i]) \quad (1)$$

Where

Metric[i] is the path metric at the last stage, max(Metric[i]) is the maximum of the path metric at the last stage, and min(Metric[i]) is the minimum of the path metric at the last stage In step S808, error counter error_count is increased since metric ratio is less than the metric threshold, it is likely the received constellation data is corrupted since the maximum and minimum are too condensed to produce good data recognition.

Pre-detection module 312 next checks if error counter error_count exceeds an error threshold, generates a error indication signal in S812 if so, and returns to step S804 for more Viterbi decoding otherwise. The error threshold is stored in a register.

Both ratio threshold and error threshold may be set by control register during initialization.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of processing input data constituting at least one data packet, comprising:
   receiving, in a communication device, the input data to perform the packet detection process;
   generating, in the communication device, an adjusted input data and an gain control parameter once the data packet is detected;
   performing, in the communication device, signal processing and demodulation to transform the adjusted input data into a demodulated input data according to at least one processing function of noise reduction, interference reduction, and signal compensation, wherein said signal processing and demodulation perform the data signal processing includes at least one of analog to digital transformation processing, radio frequency processing and baseband processing, wherein signal processing and demodulation further include detecting at least one of the desired signal, noise and interference;
   determining, in the communication device, whether a potential error has occurred in the demodulated input data by a pre-detection method prior to completing retrieval of the data packet for performing a packet-based error check sequence;
   selecting, in the communication device, at least one component to be disabled when the potential error has occurred in the demodulated input data; and
   performing, in the communication device, a packet-based error check on the data packet upon completing retrieval of the data packet when the potential error has not occurred in the demodulated input data.

2. The method of claim 1, wherein the pre-detection method comprises:
   estimating energies of the input data in at least one predetermined time interval;
   calculating energy difference between two time intervals; and
   generating an error indication signal based on the energy difference.

3. The method of claim 2, wherein generating the error based on the energy difference comprises:
   calculating an error duration if the energy difference exceeds an energy threshold; and
   generating the error indication signal if the error duration exceeds a duration threshold.

4. The method of claim 1, wherein the pre-detection method further comprises:
   providing a known preamble;
   determining a received preamble in the demodulated input data; and
   generating an error indication signal if the received preamble is not the known preamble.

5. The method of claim 1, wherein the pre-detection method comprises:
   retrieving a data symbol in the demodulated input data;
   providing an expected data symbol based on the data symbol;
   calculating an error distance between the expected data symbol and the data symbol; and
   generating an error indication signal based on the error distance.

6. The method of claim 5, wherein generating the error indication signal based on the error distance comprises:
   increasing an error count if the error distance exceeds a distance threshold; and
   generating the error indication signal if the error count exceeds a count threshold.

7. The method of claim 5, wherein the expected data symbol is an expected pilot symbol.

8. The method of claim 1, wherein the pre-detection method comprises:
performing Viterbi decoding on the demodulated input data to obtain an optimal path metrics;
calculating a metric ratio of maximum to minimum of the optimal path metrics; and
generating an error indication signal if the metric ratio exceeds a ratio threshold.

9. The method of claim 1, wherein the selection to decide whether the components need to be disabled and which of the components need to be disabled, said components that need to be disabled comprising Radio Frequency (RF), Analog-to-Digital Converter (ADC), and Baseband components;
wherein the period of time for termination is the time of waiting until the data packet has been fully received.

10. The method of claim 1, wherein the selection to decide whether the components need to be disabled and which of the components need to be disabled, said components that need to be disabled comprising the Baseband component;
wherein the packet detection is continued to be applied to the packet, which has indicated as a potential error.

11. The method of claim 1, wherein the packet-based error check is Frame Check Sequence (FCS).

12. A communication device, processing input data constituting at least one data packet, comprising:
a detection unit receiving the input data to perform packet detection;
an Automatic Gain Controller (AGC), coupled to the detection unit, generating an adjusted input data and an gain control parameter once the data packet is detected;
a signal processor, coupled to the AGC, performing data signal processing including at least one of analog to digital transformation processing, radio frequency processing and baseband processing, and detecting at least one of the desired signal, noise and interference, the signal processor producing a processed input data;
a demodulator, coupled to the signal processor, demodulating the processed input data into a demodulated input data according to at least one processing function of noise reduction, interference reduction, and signal compensation;
a pre-detection module, coupled to the demodulator, determining whether a potential error has occurred in the demodulated input data by a pre-detection method prior of completing retrieval of the data packet for performing a packet-based error check sequence, and selecting at least one component in the communication device to be disabled when the potential error has occurred in the demodulated input data
a Baseband module, coupled to the demodulator, performing a packet-based error check on the data packet upon completing retrieval of the data packet when the potential error has not occurred in the demodulated input data.

13. The communication device of claim 12, wherein the pre-detection module estimates energies of the input data in at least one predetermined time interval, calculates energy difference between two time intervals, and generates an error indication signal based on the energy difference.

14. The communication device of claim 13, wherein the pre-detection module calculates an error duration if the energy difference exceeds an energy threshold, and generates the error indication signal if the error duration exceeds a duration threshold.

15. The communication device of claim 12, wherein the pre-detection module provides a known preamble, determines a received preamble in the demodulated input data, and generates an error indication signal if the received preamble is not the known preamble.

16. The communication device of claim 12, wherein the pre-detection module retrieves a data symbol in the demodulated input data, provides an expected data symbol based on the data symbol, calculates an error distance between the expected data symbol and the data symbol, and generates an error indication signal based on the error distance.

17. The communication device of claim 16, wherein the pre-detection module increases an error count if the error distance exceeds a distance threshold, and generates the error indication signal if the error count exceeds a count threshold.

18. The communication device of claim 16, wherein the expected data symbol is an expected pilot symbol.

19. The communication device of claim 12, wherein the pre-detection module performs Viterbi decoding on the demodulated input data to obtain an optimal path metrics, calculates a metric ratio of maximum to minimum of the optimal path metrics, and generates an error indication signal if the metric ratio exceeds a ratio threshold.

20. The communication device of claim 12, wherein the pre-detection module decides whether the components need to be disabled and which of the components need to be disabled, said components that need to be disabled comprising Radio Frequency (RF), Analog-to-Digital Converter (ADC), and Baseband components;
wherein the period of time for disabling is the time of waiting until the data packet has been fully received.

21. The communication device of claim 12, wherein the pre-detection module decides whether the components need to be disabled and which of the components need to be disabled, said components that need to be disabled comprising the Baseband component;
wherein the packet detection is continued to be applied to the packet, which has indicated as a potential error.

22. A method of processing input data constituting at least one data packet, comprising:
receiving, in a communication device, the input data to perform the packet detection process;
generating, in the communication device, an adjusted input data and an gain control parameter once the data packet is detected;
performing, in the communication device, signal processing and demodulation to transform the adjusted input data into a demodulated input data according to at least one processing function of noise reduction, interference reduction, and signal compensation, wherein said signal processing and demodulation perform the data signal processing includes at least one of analog to digital transformation processing, radio frequency processing and baseband processing, wherein signal processing and demodulation further include detecting at least one of the desired signal, noise and interference;
determining, in the communication device, whether a potential error has occurred in the demodulated input data by a pre-detection method prior to completing retrieval of the data packet for performing a packet-based error check sequence;
terminating, in the communication device, at least one component when the potential error has occurred in the demodulated input data; and
performing, in the communication device, a packet-based error check on the data packet upon completing retrieval of the data packet when the potential error has not occurred in the demodulated input data.

23. A communication device, processing input data constituting at least one-data packet, comprising:
- a detection unit receiving the input data to perform packet detection;
- an Automatic Gain Controller (AGC), coupled to the detection unit, generating an adjusted input data and an gain control parameter once the data packet is detected;
- a signal processor, coupled to the AGC, performing data signal processing including at least one of analog to digital transformation processing, radio frequency processing and baseband processing, and detecting at least one of the desired signal, noise and interference, the signal processor producing a processed input data;
- a demodulator, coupled to the signal processor, demodulating the processed input data into a demodulated input data according to at least one processing function of noise reduction, interference reduction, and signal compensation;
- a pre-detection module, coupled to the demodulator, determining whether a potential error has occurred in the demodulated input data by a pre-detection method prior of completing retrieval of the data packet for performing a packet-based error check sequence, and terminating at least one component in the communication device when the potential error has occurred in the demodulated input data; and
- a Baseband module, coupled to the demodulator, performing a packet-based error check on the data packet upon completing retrieval of the data packet when the potential error has not occurred in the demodulated input data.

* * * * *